(12) United States Patent
Larsen et al.

(10) Patent No.: US 6,327,162 B1
(45) Date of Patent: Dec. 4, 2001

(54) STATIC SERIES VOLTAGE REGULATOR

(75) Inventors: Einar V. Larsen, Charlton; Kara Clark, Scotia; Reigh Walling, Cliffon Park, all of NY (US)

(73) Assignee: General Electric Company, New York, NY (US)

(*) Notice: Subject to any disclaimer, the term of this patent is extended or adjusted under 35 U.S.C. 154(b) by 0 days.

(21) Appl. No.: 08/619,104

(22) Filed: Mar. 21, 1996

Related U.S. Application Data

(63) Continuation-in-part of application No. 08/372,485, filed on Jan. 13, 1995, now abandoned.

(51) Int. Cl.[7] .................................................. H02H 7/00
(52) U.S. Cl. ..................... 363/51; 363/72; 323/207; 323/217; 323/246; 307/103; 307/105; 307/64
(58) Field of Search ........................... 307/64, 103, 105; 363/40, 65, 51, 72; 323/207, 217, 246

(56) References Cited

U.S. PATENT DOCUMENTS

| | | | |
|---|---|---|---|
| 4,277,692 | * 7/1981 | Small | 307/66 |
| 4,651,265 | 3/1987 | Stacey et al. | 363/35 |
| 5,287,288 | 2/1994 | Brennen et al. | 364/483 |
| 5,309,353 | 5/1994 | Schauder et al. | 364/148 |
| 5,319,534 | 6/1994 | Brennen | 363/40 |
| 5,319,535 | 6/1994 | Brennen | 363/40 |
| 5,321,598 | 6/1994 | Moran | 363/41 |
| 5,323,330 | 6/1994 | Asplund et al. | 364/492 |
| 5,349,517 | 9/1994 | Brennen | 363/40 |
| 5,355,295 | 10/1994 | Brennen | 363/40 |
| 5,465,203 | * 11/1995 | Bhattacharya et al. | 363/40 |

* cited by examiner

Primary Examiner—Peter S. Wong
Assistant Examiner—Shawn Riley
(74) Attorney, Agent, or Firm—Carl B. Horton; Hanh T. Pham

(57) ABSTRACT

A static series voltage regulator (SSVR) for an electric power distribution system protects a load on a feeder branch from voltage dips by boosting voltage under certain conditions. The SSVR contains a 3-phase voltage source inverter and a source bridge, fed from a source, supplying the dc side of the inverter. A series transformer is connected between the power source and a load coupling the inverter output to appear between the power source and the load. A surge filter connected in parallel with the series transformer protects the load from fast front voltage pulses produced by the inverter, and isolation and bypass switches isolate the inverter and series transformer from the power source and load. The inverter is controlled so that during normal operation it acts as a short on the series transformer, and, during a fault that causes a dip in the source voltage, it injects voltage in series with the source voltage to provide a boost action to maintain load voltage at a desired magnitude and balance. The SSVR senses the incoming voltage from the utility and load current and constructs what the load voltage would be in the absence of boost action. This information is processed through a minimum detector to obtain a signal $V_{LOXFL}$ which rapidly responds to a voltage dip but remembers a dip happened for a few cycles. When $V_{LOXFL}$ falls below some threshold then boosting begins to bring load voltage to a desired level. Boosting is halted after $V_{LOXFL}$ exceeds the threshold, or when the load voltage exceeds a high voltage threshold.

26 Claims, 14 Drawing Sheets

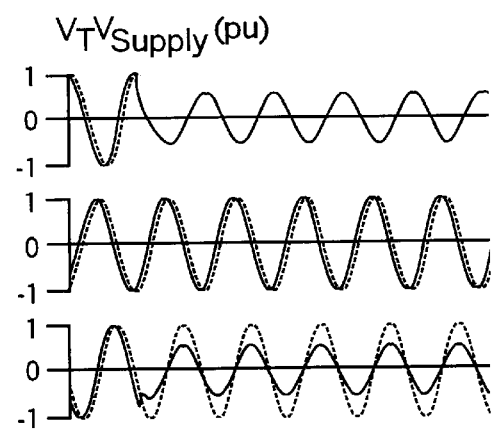
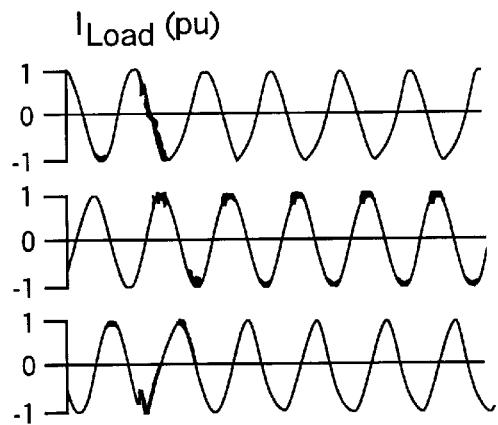
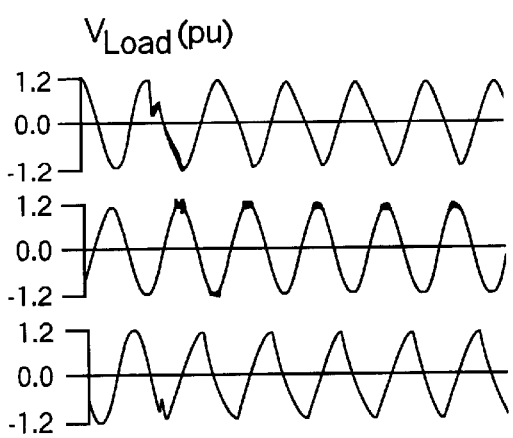
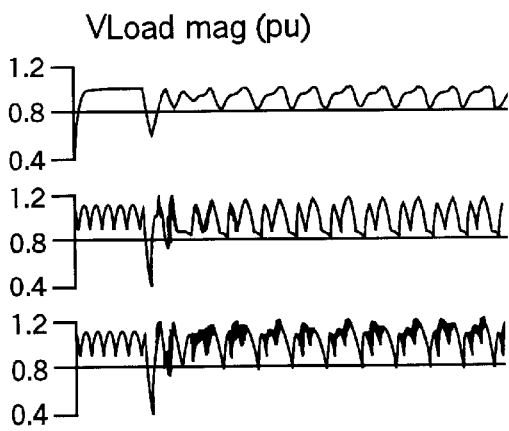
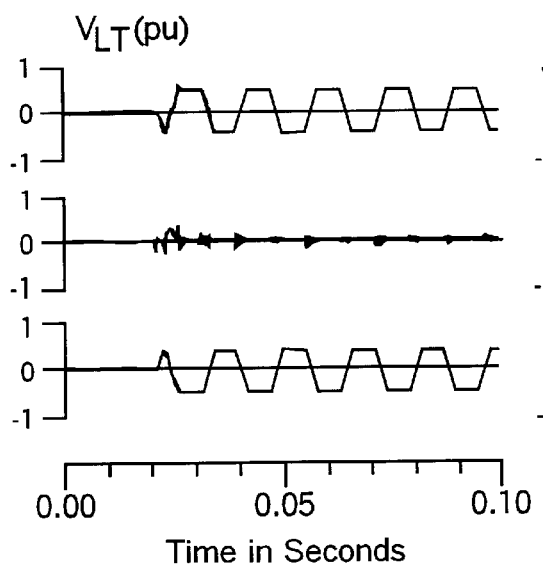
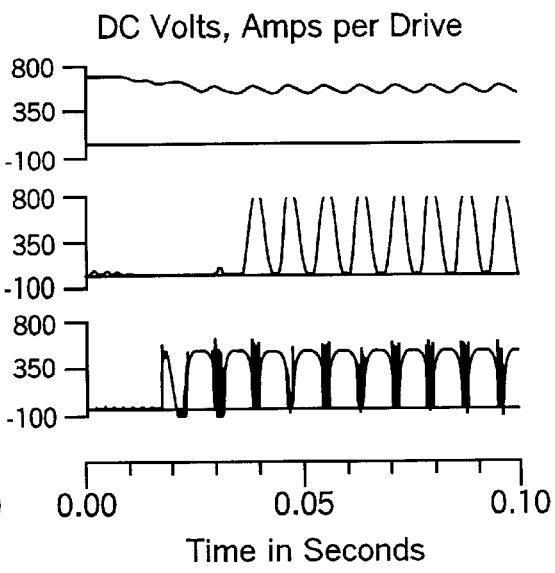
FIG. 4
FIG. 5

STATIC SERIES VOLTAGE REGULATOR

This is a continuation-in-part of copending application (s). Ser. No. 08/372,485 filed on Jan. 13, 1995 now abandoned.

TECHNICAL FIELD OF THE INVENTION

The present invention relates generally to electrical distribution switchgear, and, more particularly, to a voltage regulator for buffering loads from momentary voltage dips on utility grids.

BACKGROUND OF THE INVENTION

In the past, electric power consumers ignored service interruptions of less than three seconds. With the increasing use of digital computer equipment electric power consumers are becoming less tolerant of short term voltage dips and sags. These disturbances cause flashing clock displays, resets to VCRs and personal computers, and lost production on automated assembly lines and businesses that rely on computer networks. Voltage sags and voltage dips are two closely related problems. Voltage sag is a partial reduction in the magnitude of voltage and voltage dip describes a situation wherein the magnitude of the voltage phasor drops significantly, often to zero. Voltage sags often persist for extended periods and are usually related to system loading conditions, while voltage dips generally occur for brief durations and are caused by faults on the power system. In either case, it is desirable to support the voltage to prevent service interruption and inconvenience.

One source of complaints regarding power quality are single phase disturbances on the transmission and distribution network. Most utility distribution system disturbances are single phase events. These disturbances may have relatively long durations because ground faults can require several seconds to clear on some distribution feeders. Balanced three phase disturbances are generally less common. Major three phase voltage dips are primarily due to closing into grounded equipment, but generally last only a few cycles. Less severe voltage sags occur during transient conditions following energization of large loads or during recovery from a major network disturbance. The latter events can last for a second or more. Uninterruptible power supply is a good technical solution it is expensive especially when a large load area is to be served. Accordingly it will be appreciated that it would be highly desirable to have a relatively inexpensive voltage regulator that boosts voltage during voltage dips and sags and supports the load during severe unbalanced voltage disturbances.

SUMMARY OF THE INVENTION

The present invention is directed to overcoming one or more of the problems set forth above. Briefly summarized, according to one aspect of the invention, a static series voltage regulator for an electrical distribution system comprises a voltage source inverter having a dc input and an ac output; a source bridge, fed from a power source, supplying the dc input of the inverter; a series transformer connected between the power source and a load coupling the inverter output to appear between the power source and the load; and control means for controlling operation of the inverter so that during normal operation the inverter acts as a short on the series transformer. During a power supply fault that causes a dip in the source voltage, the inverter output is injected in series with the source voltage to provide a boost action to maintain load voltage at a desired magnitude and balance.

A relatively simple 3-phase voltage source inverter is used instead of separate inverters for each phase. A second inverter and series transformer may be connected in series and coordinated to synchronize their sampling and computation cycles so that the effective pulse width modulation (PWM) carrier frequency is doubled for more efficient boost action.

According to another aspect of the invention, a method for regulating voltage applied to a load from a power distribution transformer by providing a boost action from a static series voltage regulator includes measuring a voltage $V_T$ at an output of the power transformer: measuring a load current $I_{LMEAS}$ drawn by the load; constructing what load voltage $V_{LX}$ would be, using $V_T$ and $I_{LMEAS}$, in absence of a boost action ($V_{LX}$ compensating for impedance drop of the static series voltage regulator itself); processing the load voltage $V_{LX}$ through a minimum dip detector and obtaining a signal $V_{LXM}$ that rapidly responds to a voltage dip while remembering a dip happened for a predetermined period of time; and beginning a boost action when $V_{LXM}$ falls below a preselected threshold voltage and bringing the load voltage $V_{LX}$ to a desired level $V_{LORDLER}$.

The static series voltage regulator senses the incoming voltage from the utility and load current. From these is constructed what the load voltage would be in the absence of boost action. This information is processed through a minimum detector to obtain a signal $V_{LXM}$ which rapidly responds to a voltage dip but remembers a dip happened for a few cycles. When $V_{LXM}$ falls below some threshold, then boosting begins to bring load voltage to a desired level. Boosting is halted after $V_{LXM}$ exceeds the threshold, or when the load voltage exceeds a high voltage threshold.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 4–5 graphically illustrate the performance scenario with the SSVR.

DETAILED DESCRIPTION OF THE PREFERRED EMBODIMENTS

Figure 1:
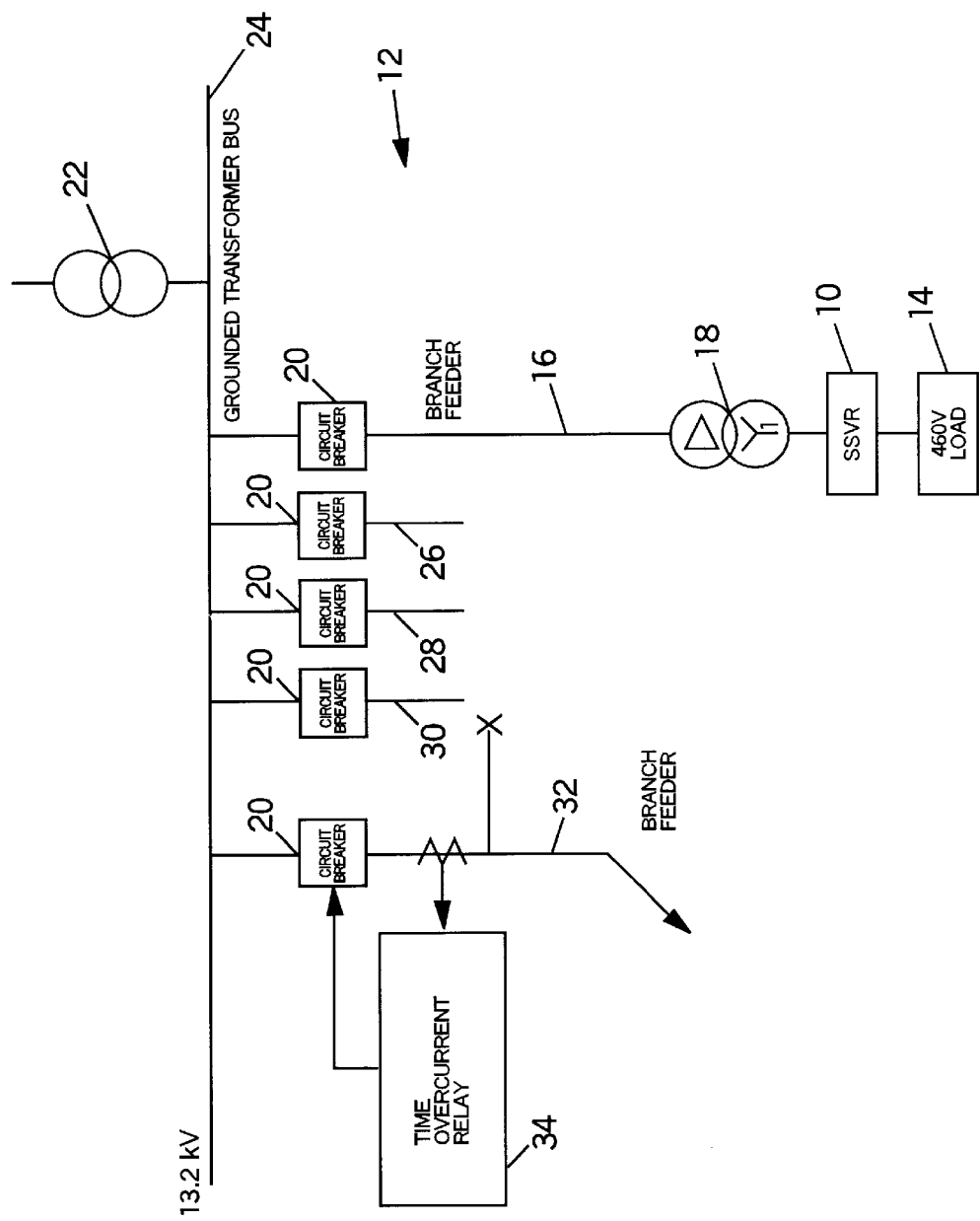
FIG. 1 is a block diagram of a preferred embodiment of an electric power distribution system incorporating a static series voltage regulator (SSVR) according to the present invention and illustrating a feeder fault scenario defining SSVR performance requirements.

The followings are a list of the reference numbers as used in the drawings and the corresponding element names of those numbers:

Referring to FIG. 1, a static series voltage regulator (SSVR) 10 is installed in an electric power distribution system 12 to protect a load 14 on a feeder branch 16 from voltage dips. The SSVR is installed between the load 14 and the Y-side of a Δ-Y distribution transformer 18. A circuit breaker 20 connects the feeder 16 to the Δ-side of the transformer 18 and to the substation transformer 22 via a grounded transformer bus 24. Other branch feeder 26, 28, 30, 32 are shown with a time overcurrent relay 34 for overcurrent protection. The typical performance criterion which determines SSVR design involves a single phase fault on a feeder, such as feeder 32, which when cleared in normal relay time will leave the load with full 3-phase power from an unfaulted source.

The minimum load voltage for this event is established by the Computer Business Equipment Manufacturers Association (CBEMA). The minimum load voltage is related to fault voltage level using CBEMA data and curves and relay characteristics and is given in the following Table 1 for typical settings of time overcurrent protection and for faults of varying impedance.

TABLE 1

Fault Voltage, Timing, and CBEMA Criterion

| Fault Current (Amps rms) | Fault Voltage (pu) | Relay Tap Multiple | Relay Pickup Time (sec) | CBEMA Min (pu) |
|---|---|---|---|---|
| 7600 | 0 | 8.3 | 0.2 | 0.79 |
| 4760 | 0.4 | 5 | 0.5 | 0.80 |
| 2860 | 0.65 | 3 | 1.5 | 0.82 |
| 2400 | 0.7 | 2.5 | 2.0 | 0.87 |

Table 1 is based upon General Electric Company relay type GE IAC 77, 6 amp tap=960 amps, 30-cycle trip @ tap 5 (4760 amps). The governing case is a solid fault, cleared in 0.2 seconds, where the CBEMA guideline establishes a minimum load voltage of 79%. For longer faults, the CBEMA requirement rises to 87%, but the source voltage is considerably higher.

Figure 2:
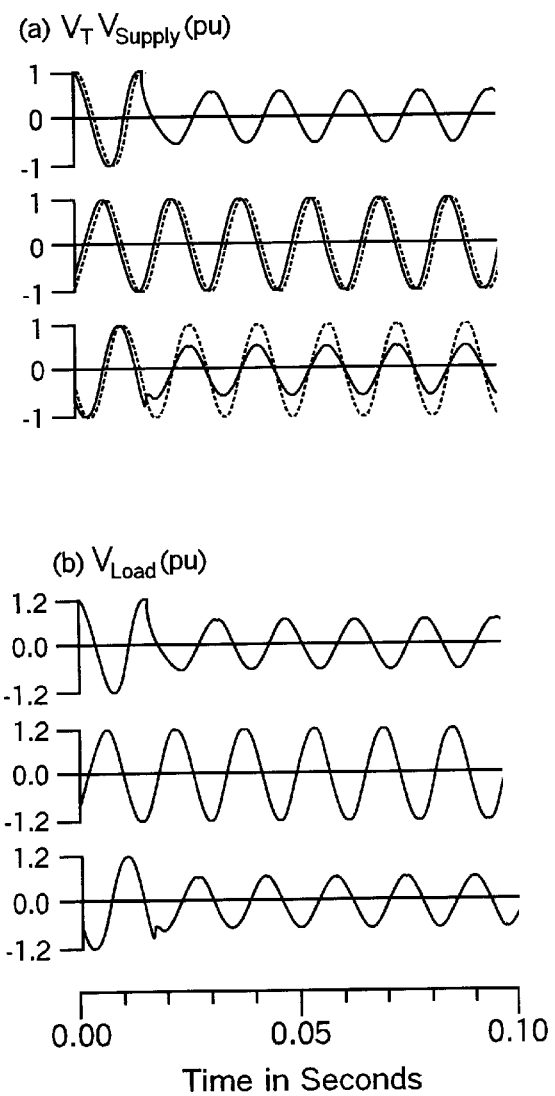
FIGS. 2–3 graphically illustrate the performance scenario during a fault without the SSVR.
Figure 3:
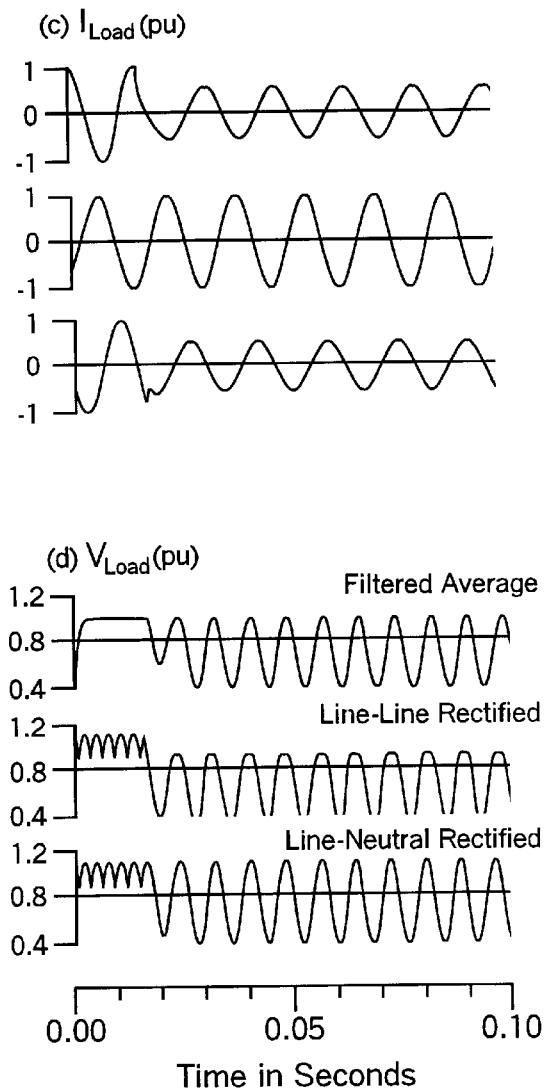

FIGS. 2–3 illustrate the performance scenario during a fault without the SSVR. During the feeder fault, the load voltage drops on two phases to approximately 57% (FIG. 2), and below 48% (not shown) on one line-to-line voltage. To create a meaningful measure to compare performance criterion, the load voltages are rectified and filtered. This is shown in FIG. 3 where the bottom two traces represent the unfiltered average of the three individual rectified phase voltages (one trace is for line-to-neutral voltages, the other for the line-to-line voltages). The top trace represents the average of the two lower signals, with a 1 ms low pass filter applied. It is this total averaged and filtered trace that is to be compared to the CBEMA criterion, because its minimum represents the lowest of the individual phase-to-neutral or phase-to-phase voltages on the load. The bottom trace of FIG. 2 shows the load voltage and the top trace of FIG. 3 shows load current.

FIGS. 4–5 illustrate the performance scenario with the SSVR. The load voltage is now above approximately 83% after the initial half cycle, well above the 79% required by CBEMA for this case. The voltage boost, $V_{LT}$, provided is seen on the two phases needing support (FIG. 4). This voltage is nearly a square wave, indicating that the inverter is providing all the boost it can in this condition. The bottom trace of FIG. 5 represents the variables on the dc link of the power electronic packages. The lowest trace is the current being drawn out of the dc link via the inverter to support the voltage boost. The middle trace is the current being supplied to the dc link by the rectifier. The top trace is the dc link voltage. Upon initial boosting, the inverter current is drawn mostly from the dc capacitor, causing its voltage to drop. After a few cycles, a steady state is attained where the ac voltage in the healthy phases is sufficient to drive current through the rectifier and recharge the dc capacitor each half cycle. This condition will persist until the fault is cleared.

Figure 6:
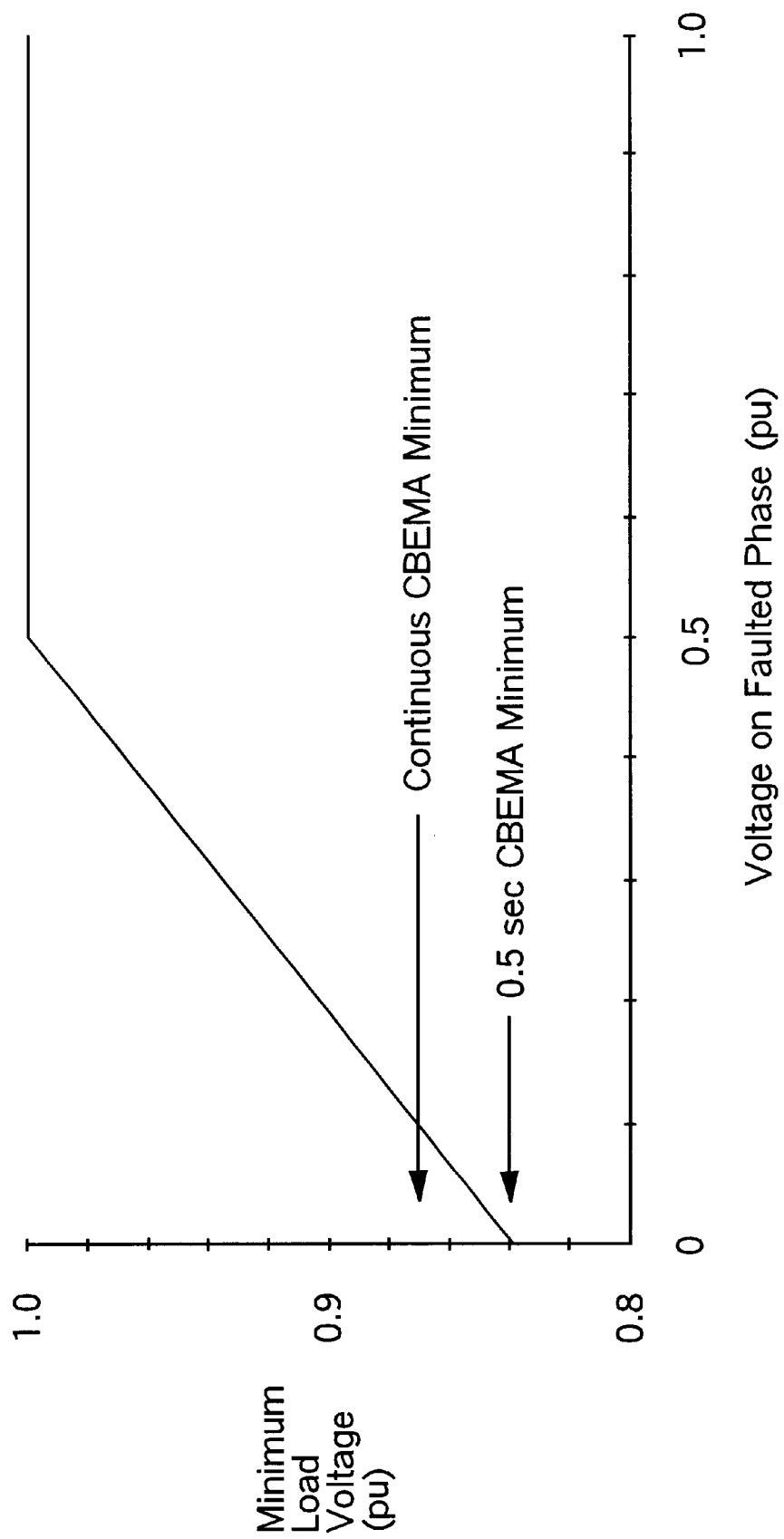
FIG. 6 shows the performance of the SSVR in terms of lowest load voltage as a function of voltage on the faulted phase.

FIG. 6 shows the performance of the SSVR in terms of lowest load voltage as a function of supply voltage on the faulted phase. This figure shows that any fault cleared in less than 0.5 seconds will meet the CBEMA criterion. Any fault having a voltage above 10% will meet the CBEMA criterion, no matter how long the fault persists.

Figure 7:
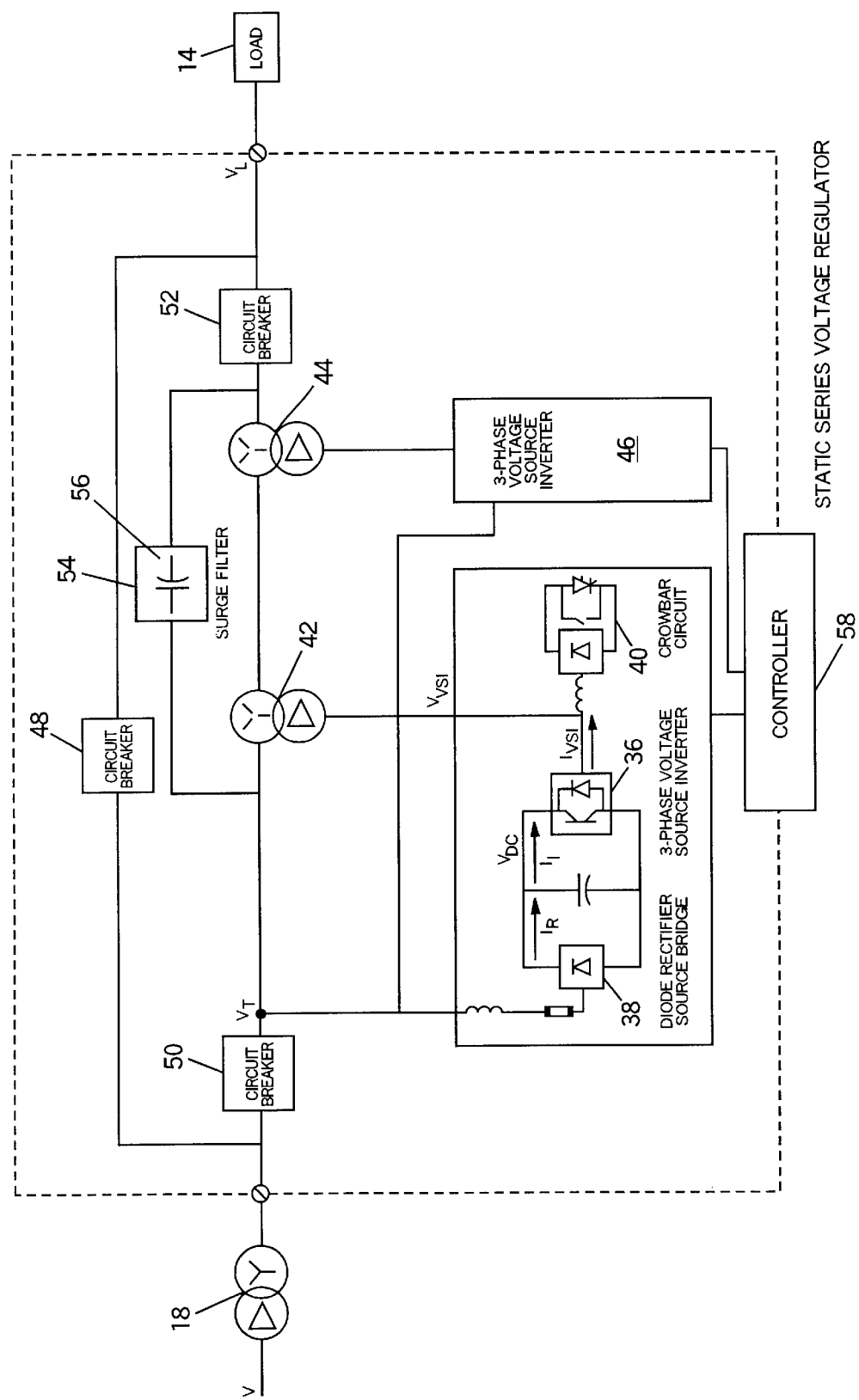
FIG. 7 is a single-line diagram of the static series voltage regulator of FIG. 1.
Figure 8:
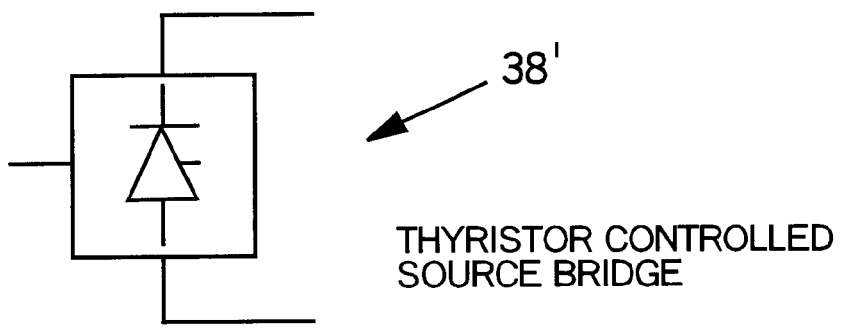
FIG. 8 is diagram of a thyristor controlled bridge.
Figure 9:
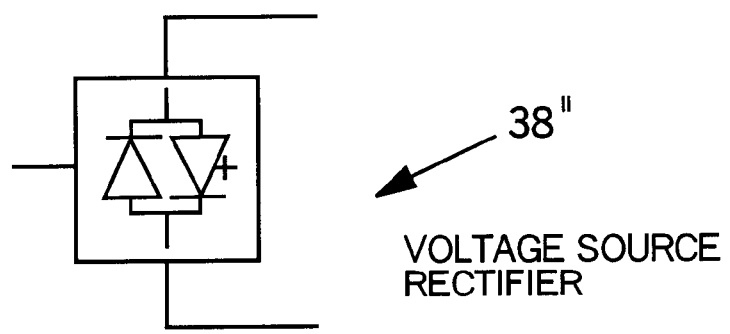
FIG. 9 is a diagram of a voltage source bridge.
Figure 10:
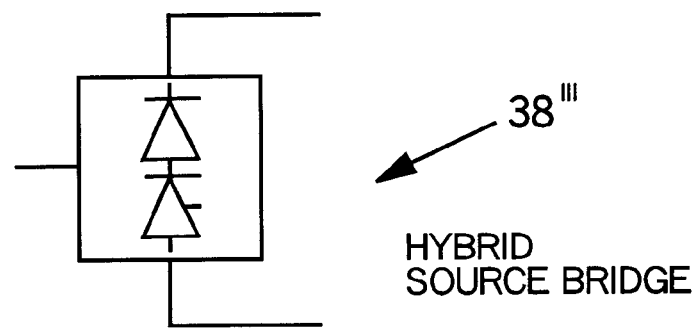
FIG. 10 is a diagram of a hybrid bridge.
Figure 22:
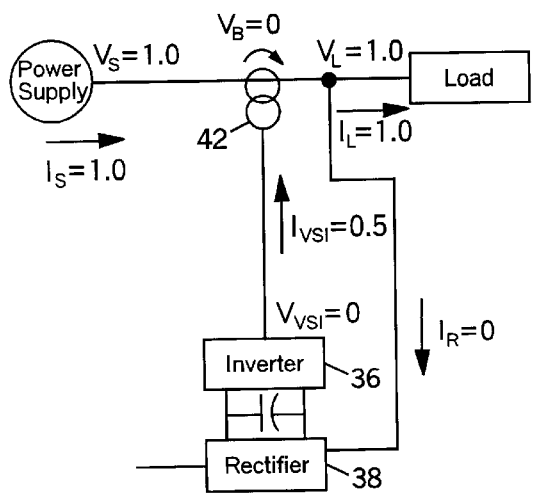
FIGS. 22–23 illustrate the different operating points for a single-line diagram of FIG. 1, wherein the source bridge is connected to the load side of the SSVR.
Figure 23:
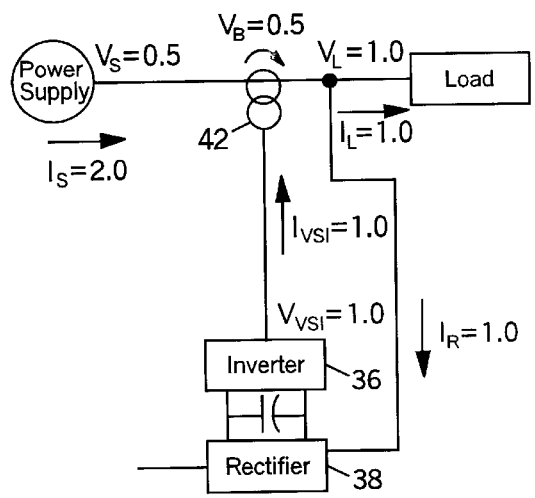

Referring now to FIG. 7, the SSVR 10 is shown in greater detail in a single-line diagram. The basic approach is to use measurements of transformer voltage, load current, load voltage, and dc voltage to calculate a voltage boost to improve load voltage response to single phase faults on the supply system. The basic components of the SSVR 10 are a first 3-phase voltage source inverter 36 with a simple source bridge 38 and a crowbar circuit 40 to protect the voltage source inverter 36. bridge 38 may be a simple rectifier bridge as shown or may be thyristor controlled 38 (FIG. 8), or a voltage source rectifier 38 (FIG. 9) or a hybrid brige 38 containing simple rectifiers bridge 38 and thyristor controlled 38 rectifiers (FIG. 10) to better regulate the de link. The source bridge is shown to be connected to the power supply side of the SSVR, but may also be connected to the load side of the SSVR as illustrated and discussed in reference to FIGS. 22 and 23. The operating currents and voltages for both connections are explained in more detail in reference to FIGS. 20–23. A first series transformer 42 couples the inverter output to appear between the load 14 and source 18. A second series transformer 44 couples a second inverter 46 between the source 18 and load 14 downstream of the first inverter 36. Bypass and isolation switches, such as circuit breakers 48, 50, 52, are provided for protection, and a surge filter 54, preferably containing a capacitor 56 connected across the series transformers 42, 44, protect load equipment from fast front voltage steps produced by the voltage source inverters 36, 46. The filter 54 draws high frequency current through the series transformers, which, in turn, attenuates the voltage steps before they appear in the load circuit. A microprocessor based controller 58 coordinates the two voltage source inverters 36, 46 to synchronize their sampling and computation cycles so that the effective pulse width modulation (PWM) carrier frequency is doubled. For example, if the sampling rate and PWM carrier frequency in each drive is 3 kHz, then by synchronizing them in an offset manner, the net effective PWM carrier frequency is shifted to 6 kHz.

Figure 11:
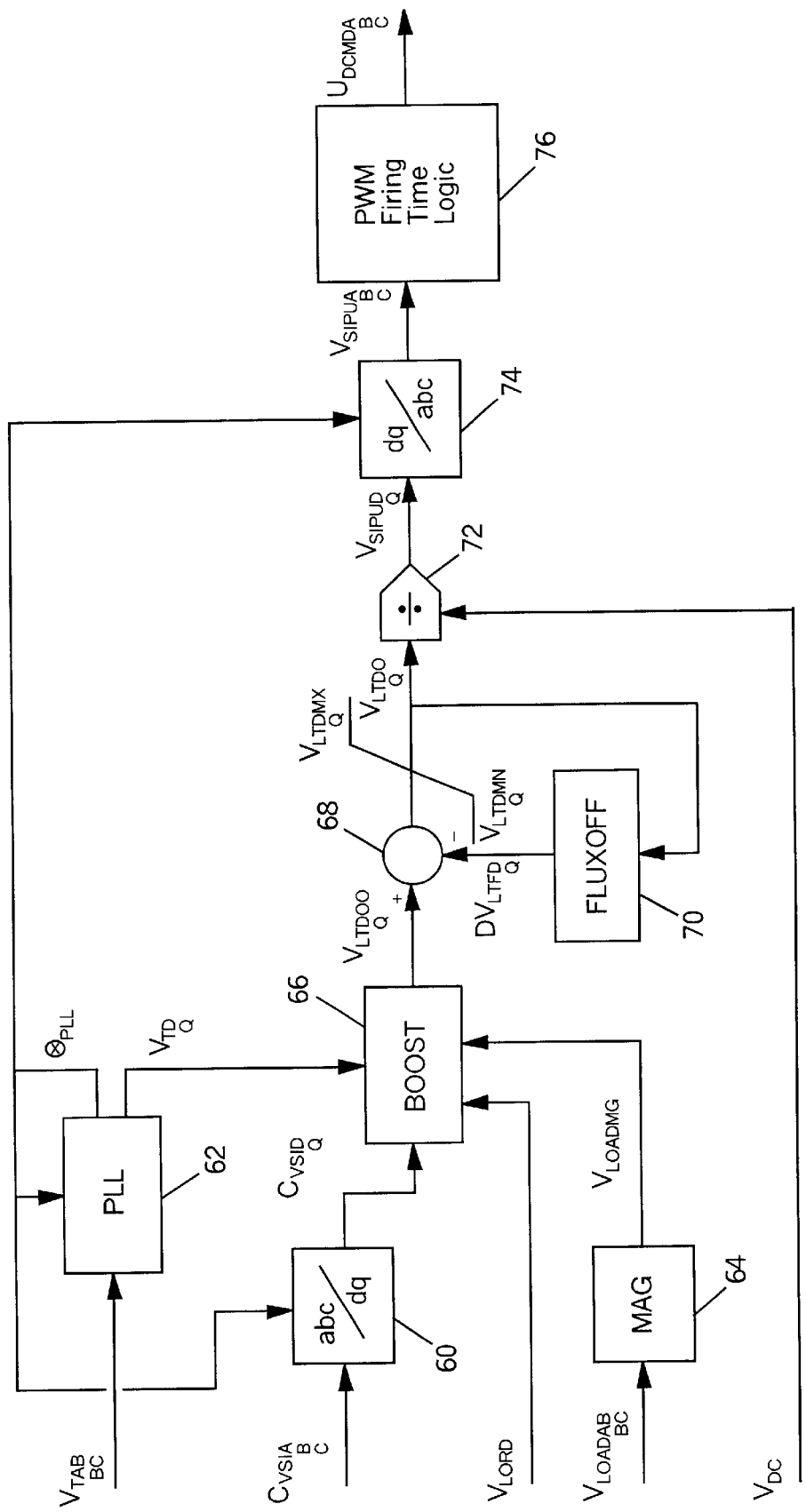
FIG. 11 is a block diagram of the control portion of the SSVR.

FIG. 11 is a block diagram of the controller 58 showing input signal processing at block 60, a phase locked loop synchronization at block 62, and rectified, filtered actual load voltage magnitude at block 64 combining for a boost action at block 66. Minimum and maximum boost orders are given at summer 68 where components of boost order from a flux offset control 70 are input. The final boost order is given at 72 and received by a signal processor 74 which inputs the final boost order to the firing time logic 76 to deliver the firing signals. In FIG. 11 the quantities are defined as follows:

$V_{TAB,BC}$=measured line voltages (volts).

$V_{TD,Q}$=d-, q-components of line voltage (pu).

$\Theta_{PLL}$=PLL angle (rad).

$C_{VSIA,B,C}$=inverter current (amps).

$C_{VSID,Q}$=d-, q-components of inverter current (pu).

$V_{LORD}$=desired load voltage (pu, def=1.0 pu).

$V_{LOADAB,BC}$=measured load voltage (volts).

$V_{LOADMG}$=rectified, filtered actual load voltage magnitude (pu).

$V_{DC}$=measured dc voltage (pu).

$V_{LTDOO,LTQOO}$=d-, q-components of boost voltage order (pu).

$D_{VLTFD,Q}$=d-, q-components of boost order from flux offset control (pu).

$V_{LTDMN,LTQMN}$=d-, q-components of minimum boost order (pu, def=−2 pu).

$V_{LTDMX,LTQMX}$=d-, q-components of minimum boost order (pu, def=2 pu).

$V_{LTDO,LTQO}$=d-, q-components of limited boost order (pu).

$V_{SIPUD,Q}$=d-, q-components of final boost order (pu).

$V_{SIPUA,B,C}$=final boost order (pu).

$U_{DCMDA,B,C}$=firing signals.

Figure 12:
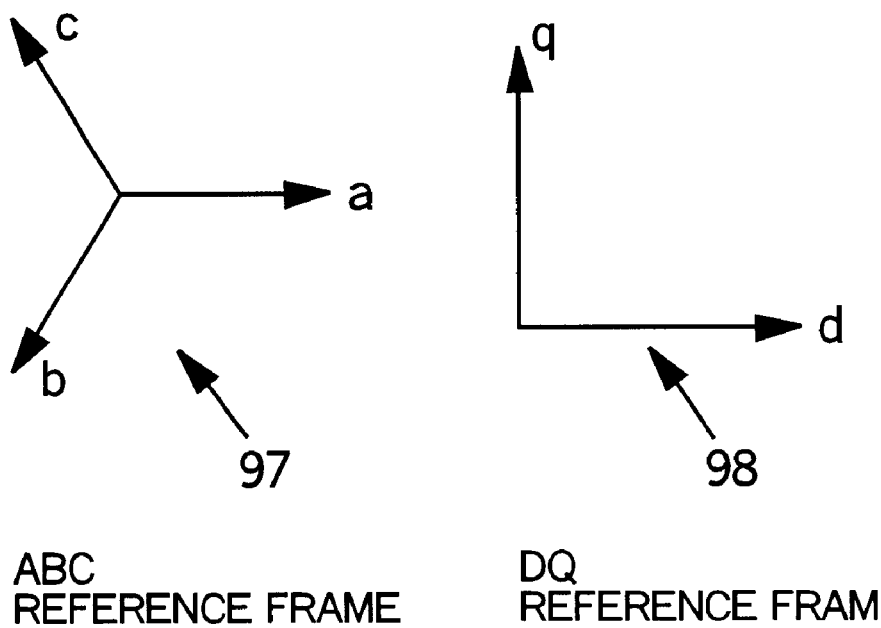
FIG. 12 illustrates the abc and dq reference frames for the abc-dq transformation.

FIG. 12 shows the abc and dq reference frames 97 and 98, respectively for the abc to dq transformation. This is an application of standard vector control principles well known in the art. The following equations described the transformations between the abc reference frame and the dq reference frame.

abc-dq:

$$V_d = \tfrac{2}{3}[(V_a-V_b)\cos\Theta - (V_b-V_c)\cos(\Theta+120°)].$$

$$V_q = -\tfrac{2}{3}[(V_a-V_b)\sin\Theta - (V_b-V_c)\sin(\Theta+120°)].$$

dq-abc:

$$V_a = V_d \cos\Theta - V_q \sin\Theta.$$

$$V_b = V_d \cos(\Theta-120°) - V_q \sin(\Theta-120°).$$

$$V_c = V_d \cos(\Theta+120°) - V_q \sin(\Theta+120°).$$

Figure 13:
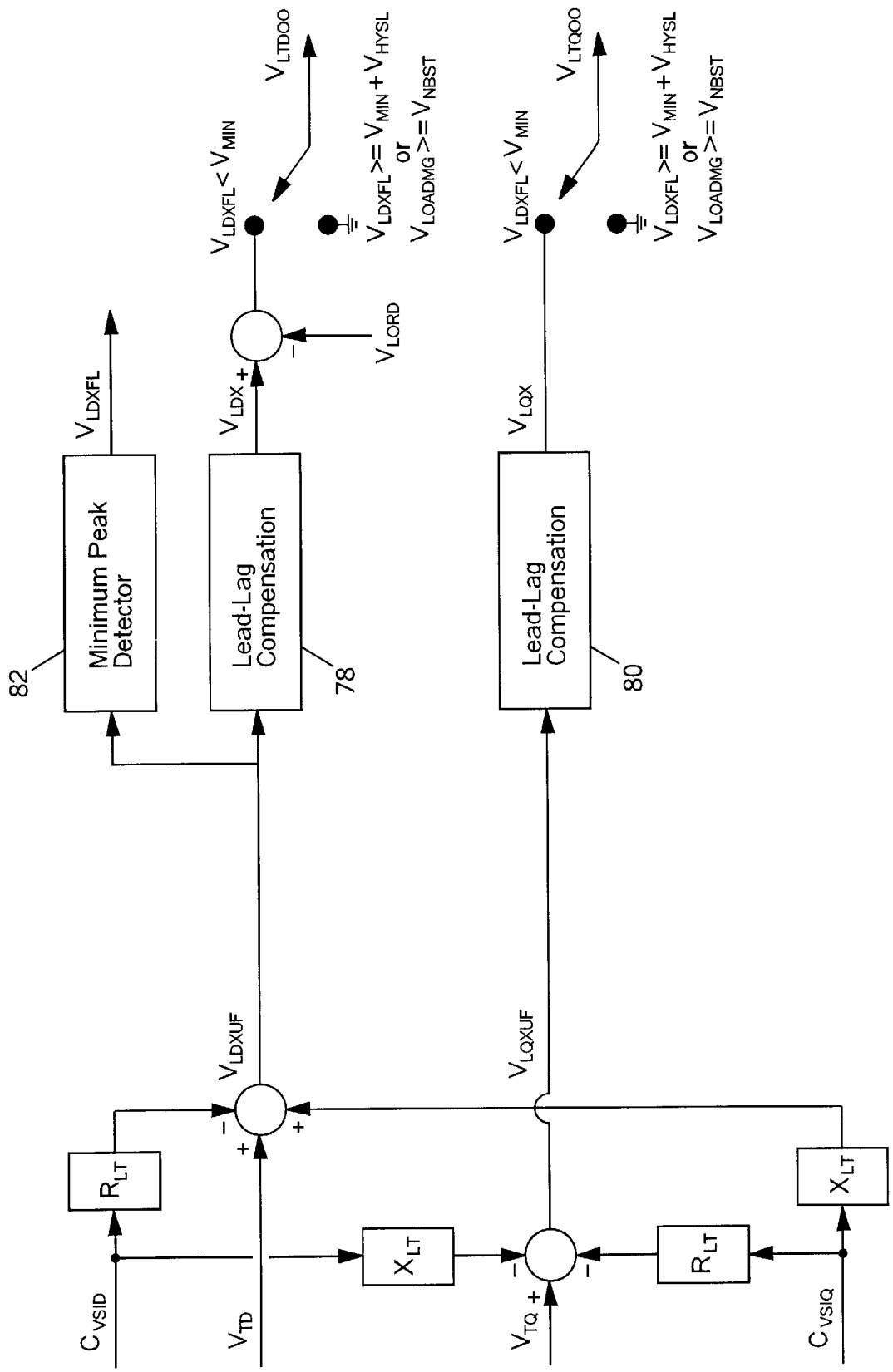
FIG. 13 is a block diagram of the voltage boost function of the control portion of the SSVR.

FIG. 13 is a block diagram of the voltage boost function. The transformer voltage, $V_{TD,Q}$, voltage source inverter current, $C_{VSID,Q}$, (equivalent to the load current with appropriate scaling by the series transformer turns ratio), and series transformer leakage impedance, $R_{LT}$, $X_{LT}$, are used to calculate the voltage at the load without any boost. This inferred load voltage, $V_{LDXUF}$, $V_{LQXUF}$, is processed through a lead-lag compensator 78, 80 to compensate for control delays. The minimum inferred voltage, $V_{LDXFL}$ is detected with a minimum peak detector 82 that immediately follows voltage decreases but follows increases through a low pass filter. The minimum inferred load voltage signal, $V_{LDXFL}$, as well as several voltage thresholds are used to determine the voltage boost orders, $V_{LTDOO}$, $V_{LTQOO}$. In FIG. 13 the quantities are defined as follows:

$C_{VSID,Q}$=d-, q-components of inverter current (pu).

$V_{TD,Q}$=d-, q-components of line voltage (pu).

$R_{LT}$=series transformer leakage resistance (pu).

$X_{LT}$=series transformer leakage reactance (pu).

$V_{LDXUF,LQXUF}$=d-, q-components of inferred load voltage (pu).

$V_{LDX,LQX}$=d-, q-components of compensated inferred load voltage (pu).

$V_{LDXFL}$=d-component of minimum inferred load voltage (pu).

$V_{LORD}$=desired load voltage (pu, def=1.0 pu).

$V_{MIN}$=minimum load voltage threshold to boost (pu).

$V_{HYSL}$=threshold hysteresis (pu, def=0.02 pu).

$V_{LOADMG}$=rectified, filtered actual load voltage magnitude (pu).

$V_{NBST}$=no boost threshold (pu, def=1.02 pu).

$V_{LTDOO,LTQOO}$=d-, q-components of boost voltage order (pu).

For a minimum inferred load voltage $V_{LDXFL}$ less than a voltage threshold $V_{MIN}$, the voltage boost orders are set to the compensated inferred voltage $V_{LDX}$. When the load voltage recovers to a value greater than $V_{MIN}$ plus some voltage hysteresis $V_{HYSL}$, the voltage boost becomes zero. The voltage boost is also zero for an actual load voltage magnitude greater than a second voltage threshold $V_{NBST}$. This prevents boosting at high actual load voltages when the inferred voltage output of the minimum peak detector is still low due to the low pass filter.

Figure 14:
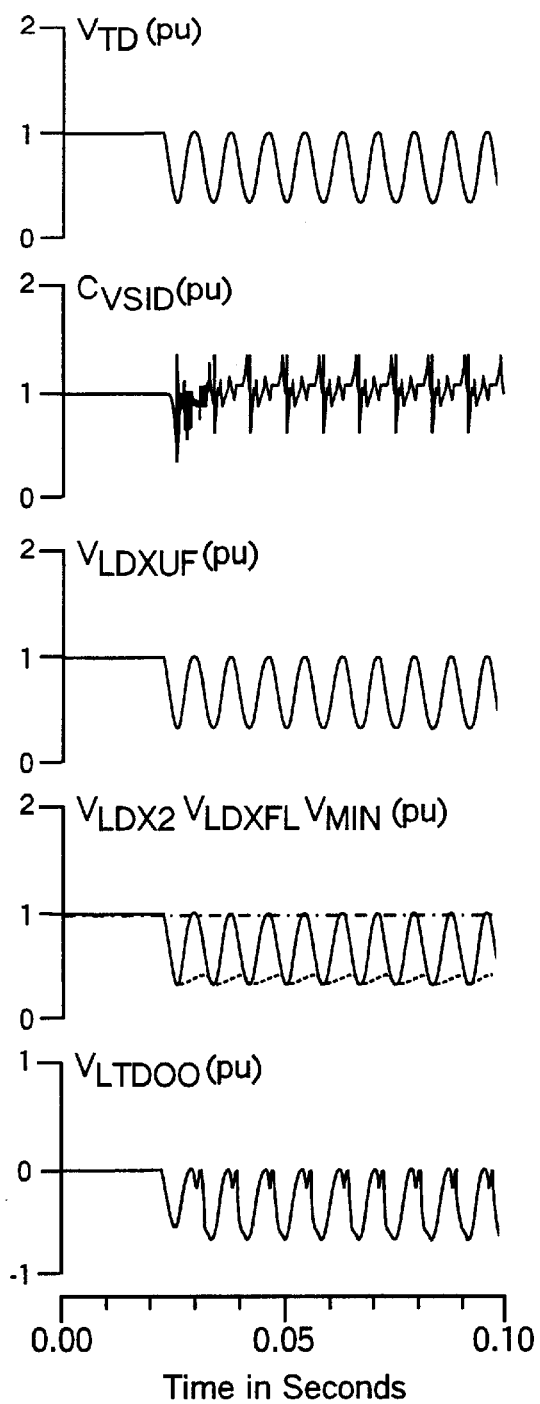
FIGS. 14–15 graphically illustrate the response of the voltage boost function variables to a single phase fault on the supply system.
Figure 15:
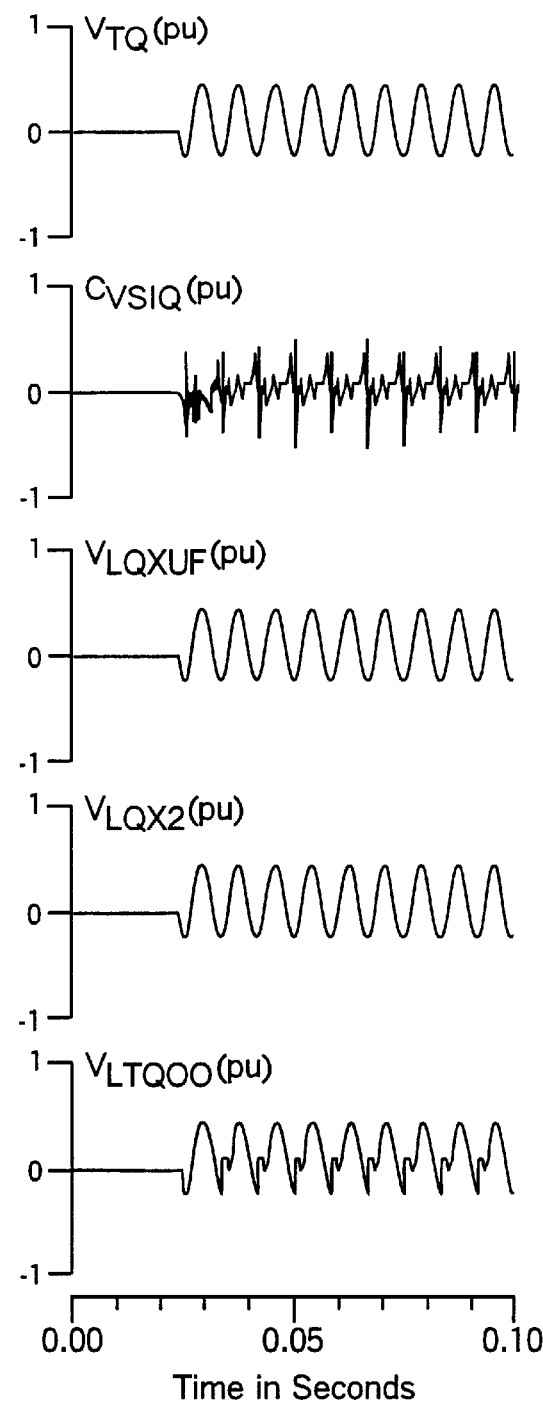

FIGS. 14–15 show the response of the voltage boost function variables to a single phase fault on the supply system. The dc components of transformer voltage and inverter current are nominally 1.0 pu, as is the filtered inferred load voltage. At 20 msec, a single phase fault is applied. This results in a 120 Hz modulation on the various signals due to the abc/dq transformation of negative sequence components. The final voltage boost variable $V_{LTDOO}$, $V_{LTQOO}$ illustrates the boost function's response to this fault.

Figure 16:
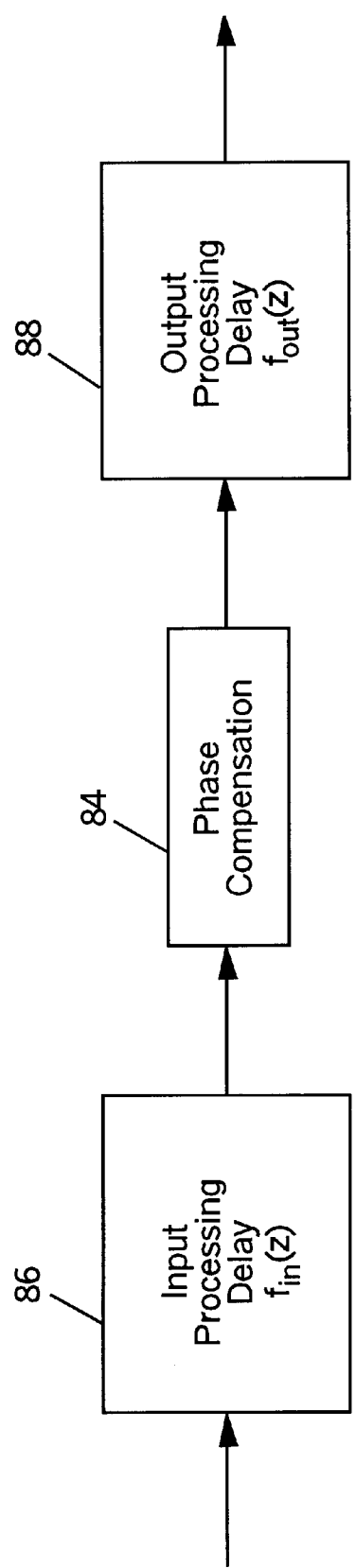
FIG. 16 is a block diagram illustrating SSVR control processing delays and a phase lead block to compensate for the delays.

The boost function requires an additional phase lead block 84 to compensate for the input and output processing delays 86, 88 inherent in the SSVR control. FIG. 16 illustrates these SSVR control processing delays. The lead-lag compensation 84 was selected to minimize the overall error at 120 Hz.

Figure 17:
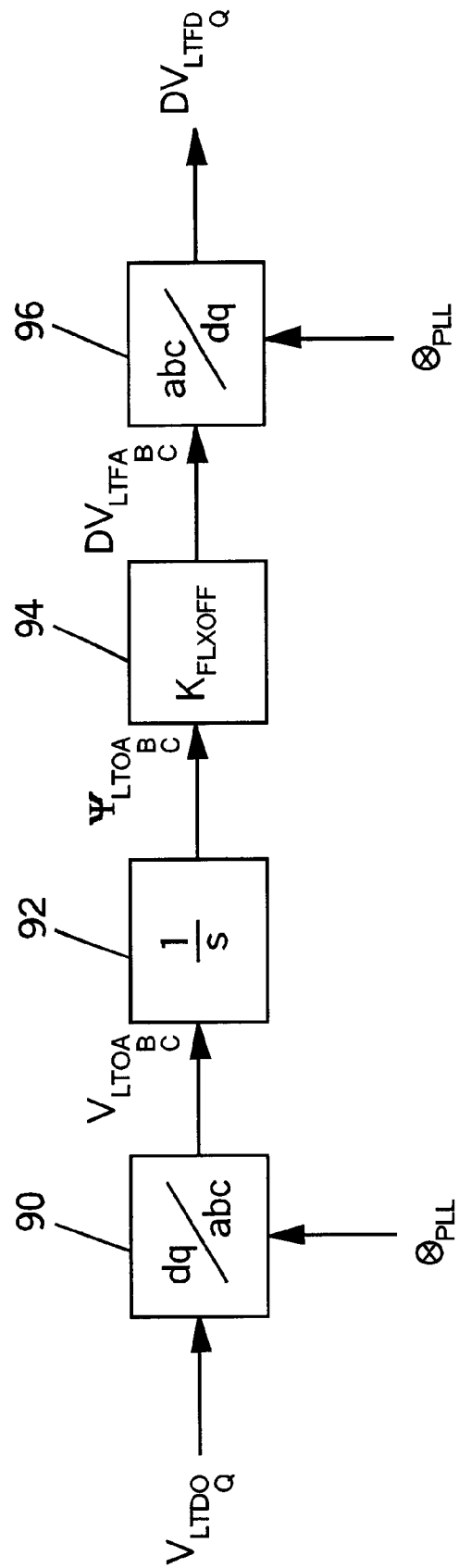
FIG. 17 is a block diagram of the flux offset control.

After a boost action, the SSVR transformer may be left with an offset flux condition. To minimize this offset, the controller 58 includes a function whereby the flux transitions are remembered and slow action is taken after the main boost event to bring the flux back toward midrange. FIG. 17 is a block diagram of the flux offset control. In FIG. 17 the quantities are defined as follows:

$V_{LTDO,LTQO}$=d-, q-components of limited boost order (pu).

$V_{LTOA,LTOB,LTOC}$=a-, b-, c-components of limited boost order (pu).

$\Theta_{PLL}$=phase angle error (rad).

$\psi_{LTOA,LTOB,LTOC}$=a-, b-, c-components of series transformer core flux (pu)

$K_{FLXOFF}$=proportional gain.

$DV_{LTFD,Q}$=d-, q-components of flux offset control boost contribution (pu).

$DV_{LTFA,B,C}$=a-, b-, c-components of flux offset control boost contribution (pu).

The flux offset control starts at block 90 with dq-abc transformation on the commanded inverter voltages, $V_{LTDO,LTQO}$, to get back to the three individual phases, $V_{LTOA,LTOB,LTOC}$. These are input to integrator 92 to predict fluxes, $\psi_{LTOA,LTOB,LTOC}$, on the transformer cores for the three individual phases. The controller generates correction signals as signals proportional to these fluxes via gain $K_{FLXOFF}$ in proportional gain control 94. These are transformed back to the vector dq coordinates of the regulator at block 96 and summed into the final voltage order (in summer 68 of FIG. 11) with a minus sign. By closing this loop, the signal $DV_{LTF}$ will continue to have an average value as long as the flux is offset. In steady state, the flux can have no offset because of the action of the integrator 92 and gain control 94. The gain control 94 determines how quickly flux offset is nulled.

Figures 18, 19:
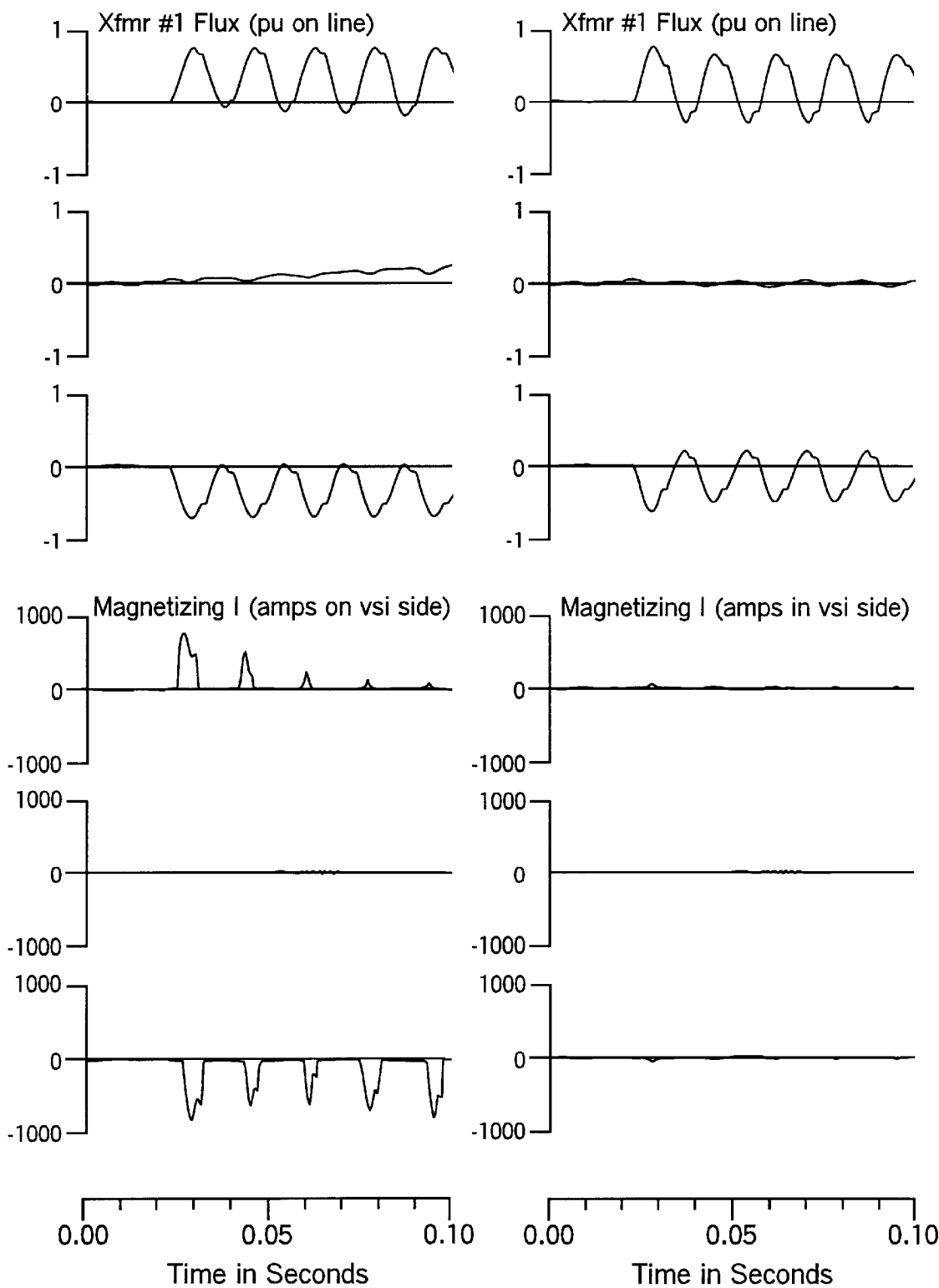
FIGS. 18–19 graphically illustrate flux offset control performance.

FIGS. 18–19 illustrate the benefit of using the flux offset control. These figures show key variables of the coupling transformer during the boost operation generally described in conjunction with FIGS. 4–5. FIG. 18 represents a case without the flux offset control, while FIG. 19 is the same event with the flux offset control enabled. In each figure, the top set of three traces represents the magnetic flux in the iron core of the three phases of the transformer. The bottom set of three traces represents the magnetizing current drawn from the voltage source inverter to support this level of flux. Ideally, the transformer core flux would remain below this saturation level so that the magnetizing current would be negligible compared to the load current. When significant magnetizing current is drawn, the performance of the voltage regulator suffers. The transformer coupling is reduced, and the added current loading on the inverter can cause it to shut down when it is most needed for its primary function.

It is clear from FIGS. 18–19 that the flux offset control provides tremendous improvement in reducing the magnetizing current, by bringing the average component of flux towards zero rather than allowing it to remain near one extreme after the initial response of the boost control. As a practical matter, this function ensures more reliable operation, and also economy by minimizing the required amount of iron needed in the transformer core.

Other factors, such as the positioning of the source bridge (item 38 in FIG. 7), also help to maximize the performance and the economy of the SSVR. Two different positions of the source bridge 38 and the resulting operating currents and voltages are shown in FIGS. 20–23. Specifically, in FIGS. 20–21 the source bridge 38 is connected to the power supply side of the SSVR, and in FIGS. 22–23 the source bridge 38 is connected to the load side of the SSVR.

Figure 20:
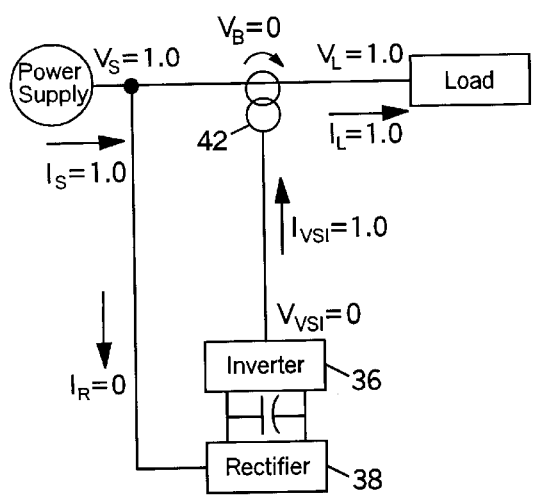
FIGS. 20–21 illustrate the different operating points for FIG. 7, in which the source bridge is connected to the power supply side of the SSVR.
Figure 21:
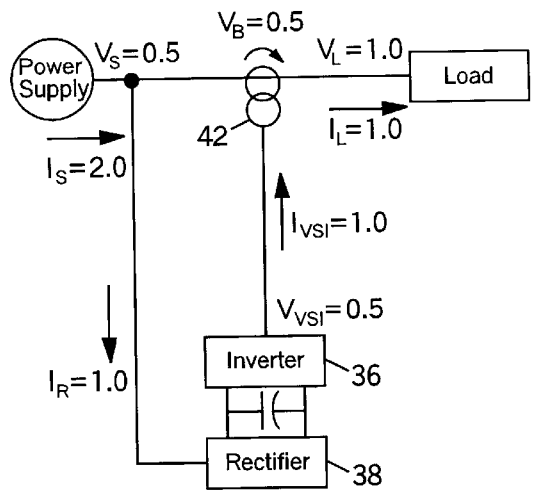

As shown in FIG. 20, the system is operating in the normal state with the power supply providing normal rated 1.0 pu voltage. In the normal state, the SSVR is not required to provide a voltage boost, thus the boost voltage is zero ($V_B$=0). Rated current (1.0 pu) is being drawn from the power supply. This current is simultaneously being carried by the inverter in its freewheeling state. The current provided to the source bridge 38 (configured as a rectifier bridge in this example) is zero ($I_R$=0) because there is no boost being provided. In FIG. 21, the power supply suffers a voltage loss of 50% of its rated voltage ($V_S$=0.5 pu). The SSVR creates a boost of $V_B$=0.5 pu to bring the load voltage back up to rated voltage ($V_L$=1.0 pu). The current drawn from the power supply is now 2.0 pu, providing 1.0 pu current to the source bridge 38. However, because the source bridge 38 is connected to the power supply, it receives the power supply's depressed voltage, which, since the source bridge is preferably a rectifier bridge or simple diode, depresses the dc link voltage to 50%. This, in turn, depresses the ac output voltage of the inverter to 50% ($V_{VSI}$=0.5 pu). Consequently, the turns ratio of the transformer 42 is set for this condition, namely 1:1.

In FIG. 22, the system is again operating in the normal state (i.e., $V_B$=0). The source bridge 38 is now connected to the load side of the SSVR. As in the previous example, rated current is being drawn from the power supply and the current provided to the source bridge 38 is zero ($I_R$=0). When the power supply voltage is depressed to 50%, as shown in FIG. 23, the SSVR will again produce the boost voltage needed to keep the load at its rated voltage. In this case, since the load is sustained at its rated voltage, and since the source bridge 38 is now connected to the load, the system is able to sustain a rated voltage on the dc link. Consequently, the inverter 36 now produces rated output voltage ($V_{VSI}$=1.0 pu). Thus, the turns ratio of the series transformer 42 need only be 0.5:1 for this circuit, that is, only 0.5 turns are needed to create the required 50% boost voltage with the 100% inverter voltage. Furthermore, the current through the inverter $I_{VSI}$ is only half the load current. As part of the change in the system, the current in the inverter will rise during the boost period. In this case, the current in the SSVR must double because it carries the full source current. Thus, when the source bridge is connected to the load side of the SSVR, the inverter current $I_{VSI}$ varies with load-side source bridge 38, rather than the voltage $V_{VSI}$ varying and the inverter current $I_{VSI}$ staying constant as shown with the supply-side source bridge.

It can now be appreciated that there has been presented a static, series voltage regulator that boosts voltage during voltage dips and sags and supports the load during severe unbalanced voltage disturbances. Operation of the SSVR involves sensing the incoming voltage from the utility, as measured at the transformer terminals and load current, $I_{LMEAS}$. The load current $I_{LMEAS}$ is defined as the current which passes through the series transformer of the SSVR. This current is proportional to the inverter current $C_{VSI}$ (also referred to as $I_{VSI}$) according to the turns ratio of the series transformer. Since the load current is typically measured through the inverter, it will be subsequently referred to in terms of $C_{VSI}$ or $I_{VSI}$. From the measured $V_T$ and $I_{LMEAS}$, the next step is constructing what the load voltage would be in the absence of boost action ($V_{LX}$, compensating for the impedance drop of the SSVR itself). This information is processed through a minimum detector to obtain a signal $V_{LXM}$ which rapidly responds to a voltage dip but remembers a dip happened for a few cycles. When $V_{LXM}$ falls below some threshold (e.g., 0.87 to 0.95 pu), then boosting begins to bring load voltage to a desired level ($V_{LORDER}$, typically=1.0). Boosting is halted after $V_{LXM}$ has been above the threshold plus hysteresis (e.g., 0.02 pu), or when the load voltage $V_{LMEAS}$ exceeds a high voltage threshold (e.g., 1.05 pu).

After a boost action, the SSVR transformer may be left with an offset flux condition, depending upon the exact timing of the boost requirements. To minimize this offset, the controls include a function whereby the flux transitions are remembered and slow action is taken after the main boost event to bring the flux back toward midrange. When boosting under certain fault timing considerations, it is possible to drive the SSVR series transformer into saturation. If this were ignored, performance would be at risk. The control features included in the SSVR include this consideration. Where a feeder fault occurs at a voltage zero, rather than at crest, an examination of the transformer flux and magnetizing current would indicate that there is an initial offset flux condition, but that the controller acts to limit the magnetizing current on the first cycle, then to reset the flux to prevent further saturation during the boost transient. The result is that the voltage is held above the criterion for the entire transient.

While the invention has been described with particular reference to the preferred embodiments, it will be understood by those skilled in the art that various changes may be made and equivalents may be substituted for elements of the preferred embodiments without departing from invention. For example, other source bridges and hybrid bridges are possible other than then ones illustrated and described.

As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

STATIC SERIES VOLTAGE REGULATOR

| 10 | static series voltage regulator |
| 12 | electric power distribution system |
| 14 | load |
| 16 | feeder branch |
| 18 | distribution transformer |
| 20 | circuit breaker |
| 22 | substation transformer |
| 24 | grounded transformer bus |
| 26 | branch feeder |
| 28 | branch feeder |
| 30 | branch feeder |
| 32 | branch feeder |
| 34 | time overcurrent relay |
| 36 | 3-phase voltage source inverter |
| 38 | diode rectifier source bridge |
| 40 | crowbar circuit |
| 42 | series transformer |
| 44 | series transformer |
| 46 | 3-phase voltage source inverter |
| 48 | circuit breaker |
| 50 | circuit breaker |
| 52 | circuit breaker |
| 54 | surge filter |
| 56 | capacitor |
| 58 | microprocessor based controller |
| 60 | input signal processor |
| 62 | PLL synchronizer |
| 64 | magnitude block |
| 66 | boost block |
| 68 | summer |
| 70 | flux offset control |
| 72 | final boost order block |
| 74 | signal processor |
| 76 | firing time logic |
| 78 | lead-lag compensator |
| 80 | lead-lag compensator |
| 82 | minimum peak detector |
| 84 | phase lead block |
| 86 | input processing delay |
| 88 | output processing delay |
| 90 | transformation block |
| 92 | integrator |
| 94 | proportional gain control |
| 96 | transformation block |

What is claimed is:

1. A static series voltage regulator for an electrical distribution system, said electrical distribution system having a power source outputting a source voltage and a load receiving a load voltage connected to said voltage source, said static series voltage regulator comprising:

a first voltage source inverter having a dc input and an ac output;

a source bridge, fed from said power source, supplying said dc input of said first inverter;

a first series transformer connected between said power source and said load coupling said first inverter output to appear between said power source and said load; and control means for controlling operation of said first inverter so that during normal operation said first inverter acts as a short on said first series transformer and during a power supply fault that causes a dip in the source voltage said first inverter output is injected in series with said source voltage to provide a boost action to maintain load voltage at a desired magnitude and balance.

2. A voltage regulator, as set forth in claim 1, including:

a second voltage source inverter connected downstream of said first inverter between said power source and said load coupling said second inverter output to appear between said power source and said load; and a second series transformer connected downstream of said first series transformer between said power source and said load coupling said second inverter output to appear between said power source and said load.

3. A voltage regulator, as set forth in claim 1, wherein said source bridge is a full-wave diode rectifier bridge.

4. A voltage regulator, as set forth in claim 1, wherein said source bridge includes a thyristor controlled rectifier.

5. A voltage regulator, as set forth in claim 1, wherein said source bridge is a voltage source rectifier.

6. A voltage regulator, as set forth in claim 1, wherein said source bridge comprises full-wave diode rectifiers and thyristor-controlled rectifiers.

7. A voltage regulator, as set forth in claim 1, including a surge filter connected in parallel with said first series transformer to protect said load from fast front voltage pulses produced by said first inverter.

8. A voltage regulator, as set forth in claim 7, wherein said surge filter includes a capacitor.

9. A voltage regulator, as set forth in claim 1, including:

first and second isolation switches for isolating said first inverter, first series transformer and surge filter from said power source and load, said first isolation switch being connected between said power source and a source side of said first inverter and first series transformer, said second isolation switch being connected between said load and a load side of said first inverter and first series transformer and;

a bypass switch having one side connected to a source side of said first isolation switch and another side connected to a load side of said second isolation switch to energize said load and bypass said first inverter and first series transformer when said first and second isolation switches are open.

10. A voltage regulator, as set forth in claim 1, wherein said control means includes means for compensating for phase shifts from processing delays inherent in said control means.

11. A voltage regulator, as set forth in claim 1, wherein said control means includes means for injecting voltage only during ac system voltage sags and dips to minimize distortion during normal operation.

12. A voltage regulator, as set forth in claim 1, wherein said control means includes means for minimizing effect of offset flux in said first series transformer core.

13. A voltage regulator, as set forth in claim 1, including means for remembering flux transitions and slowly acting after a boost action to bring flux back toward midrange wherein said first series transformer undergoes flux transitions and experiences an offset flux condition.

14. A voltage regulator, as set forth in claim 1, including means for summing boost order components and flux offset components and obtaining a final voltage boost order.

15. A method for regulating voltage applied to a load from a power distribution transformer by providing a boost action from a static series voltage regulator, comprising the steps of:

measuring a voltage $V_T$ at an output of said power transformer;

measuring a load current $I_{LMEAS}$ drawn by said load;

constructing what load voltage $V_{LX}$ would be, using $V_T$ and $I_{LMEAS}$, in absence of a boost action ($V_{LX}$ compensating for impedance drop of the static series voltage regulator itself);

processing said load voltage $V_{LX}$ through a minimum dip detector and obtaining a signal $V_{LXM}$ that rapidly responds to a voltage dip while remembering a dip happened for a predetermined period of time; and beginning a boost action when $V_{LXM}$ falls below a preselected threshold voltage and bringing said load voltage $V_{LX}$ to a desired level $V_{LORDER}$.

16. A method, as set forth in claim 15, including ending said boost action when $V_{LXM}$ exceeds said threshold voltage plus hysteresis.

17. A method, as set forth in claim 15, including ending said boost action when measured load voltage $V_{LMEAS}$ exceeds a preselected high-voltage threshold.

18. A method, as set forth in claim 15, wherein said static series voltage regulator has first and second inverters and including synchronizing sampling and computation cycles of said inverters and multiplying effective pulse width modulation carrier frequency.

19. A method, as set forth in claim 15, wherein said static series voltage regulator has a control capable of predicting offset flux in a coupling transformer after a boost action and including remembering flux transitions and slowly bringing flux toward midrange.

20. A method, as set forth in claim 15, including compensating for phase shifts from processing delays inherent in the static series voltage regulator control.

21. A method, as set forth in claim 15, including summing boost order components and flux offset components and obtaining a final voltage boost order.

22. A method for regulating voltage applied to a load from a power distribution transformer by providing a boost action from a static series voltage regulator, comprising the steps of:

calculating an inferred voltage at said load without a boost;

processing said inferred voltage through a lead-lag compensator and compensating for processing delays; and determining voltage boost orders using compensated inferred load voltage and set point for desired load voltage.

23. A method, as set forth in claim 22, including detecting a minimum of compensated inferred load voltage;

immediately following a decrease of inferred load voltage and following an increase through a low pass filter; and setting boost order to the inferred load voltage when the minimum inferred voltage is less than a voltage threshold.

24. A method, as set forth in claim 22, including setting boost order to zero when the load voltage recovers to a value greater than a threshold voltage plus voltage hysteresis.

25. A method, as set forth in claim 22, including setting boost order to zero when actual load voltage magnitude exceeds a threshold voltage.

26. A voltage regulator, as set forth in claim 1, wherein said source bridge is connected to said load and is fed from said power source through said series transformer.

* * * * *